United States Patent [19]
Laprade et al.

[11] 4,046,120
[45] * Sept. 6, 1977

[54] REGULATING SYSTEM WITH ELECTROMAGNETIC VALVE AND CONTROL VALVE

[76] Inventors: Bernard R. Laprade; Xavier J. Laprade, both of Arudy - 64 260; Pierre J. Gele, 3, rue Vaussenat, Tarbes, all of France

[*] Notice: The portion of the term of this patent subsequent to Aug. 31, 1993, has been disclaimed.

[21] Appl. No.: 612,457

[22] Filed: Sept. 11, 1975

[30] Foreign Application Priority Data

Sept. 27, 1974 France ................................ 74.32606
June 18, 1975 France ................................ 75.19078

[51] Int. Cl.² .......................................... F02M 21/07
[52] U.S. Cl. .............................. 123/120; 123/119 D; 123/119 EC
[58] Field of Search ....... 123/119 R, 119 D, 119 DB, 123/119 E, 119 EC, 32 EE, 121, 127, 120

[56] References Cited

U.S. PATENT DOCUMENTS

| | | | |
|---|---|---|---|
| 2,220,558 | 11/1940 | Van Dijk et al. | 123/32 EE |
| 3,540,419 | 11/1970 | Fox | 123/120 |
| 3,890,946 | 6/1975 | Wahl | 123/127 |
| 3,952,710 | 4/1976 | Kawarada | 123/32 EE |
| 3,963,009 | 6/1976 | Mennesson | 123/119 D |
| 3,977,375 | 8/1976 | Laprade | 123/119 D |

*Primary Examiner*—Wendell E. Burns
*Attorney, Agent, or Firm*—Finnegan, Henderson, Farabow & Garrett

[57] ABSTRACT

An internal combustion engine of a known design includes a device for correcting the air-fuel dose. The device has a gas inlet connected to the induction manifold, and a control valve controlling the gas inlet. The control valve is controlled by the negative pressure at the throat of a venturi by means of a control means including a spring biassed diaphragm and subjected to the negative pressure. The said pressure may be modified by an electromagnetic valve controlled by means of a probe positioned in the exhaust manifold, which delivers electrical current varying in accordance with the burned gases. This current controls, via an electronic device, and electromagnetic valve.

10 Claims, 2 Drawing Figures

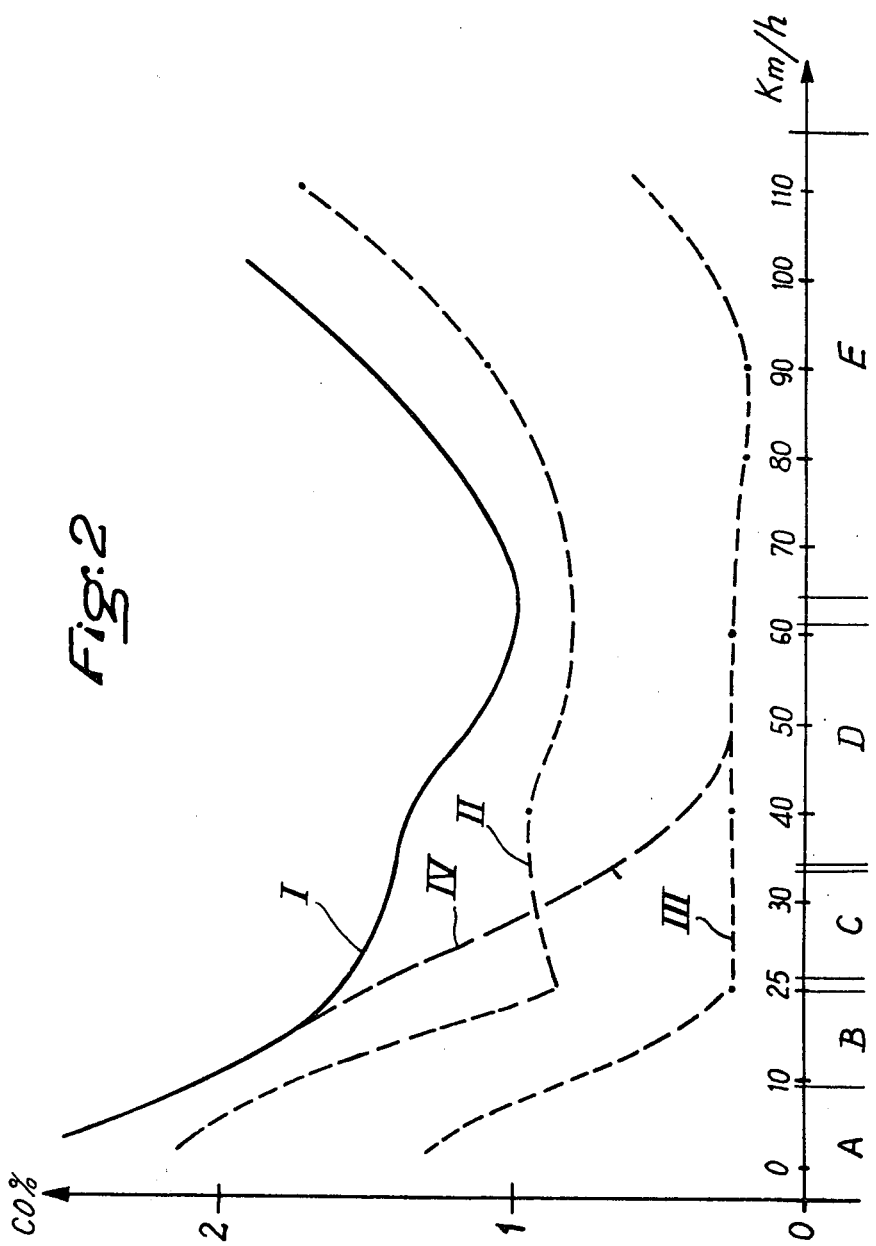

REGULATING SYSTEM WITH ELECTROMAGNETIC VALVE AND CONTROL VALVE

BACKGROUND OF THE INVENTION

In the Patent Specification Serial No. 482,881 of the June 25, 1974, there was described a device for correcting the air-fuel dose of internal combustion engines comprising at least one auxiliary air inlet connected to the induction manifold of the engine downstream of the member determining the dosing of the air-fuel-mixture, at least one control valve controlling the said auxiliary air inlet or inlets, the said control valve being controlled by the negative pressure prevailing in the throat of the venturi of the dosing device by means of a capsule whose diaphragm, elastically preloaded, is subjected to the said negative pressure by way of a conduit opening into the said body, the said negative pressure being itself modified by an electromagnetic valve, the opening of which is controlled by a probe arranged in the exhaust manifold and adapted to deliver an electrical current adapted to be varied in accordance with the composition of the burned gases.

The applicants have found that the device thus described is directly applicable to internal combustion engines using a gas fuel, or internal combustion engines combining the use of two fuels by using the auxiliary air inlet as a fuel gas inlet.

When the fuel is only gas, the carburettor can be dispensed with, and in that case there only remains in the induction pipe the venturi making it possible to take the dynamic negative pressure prevailing in the induction pipe, followed by the butterfly valve for regulating the air intake, the gas inlet conduit opening downstream of the said butterfly valve.

When the carburettor is retained, it is regulated so as to provide a lean mixture and the probe ensures the automatic regulation of the additional fuel gas.

SUMMARY OF THE INVENTION

Thus the present invention has as its object to provide a device for correcting the air-fuel dose in internal combustion engines characterised in that it comprises at least one gas inlet connected to the induction manifold, downstream of the butterfly valve determining the rate of air flow, at least one control valve controlling the said gas inlet or inlets, this control valve being controlled by the negative pressure prevailing in the throat of a venturi situated in the induction pipe, upstream of the butterfly valve, by means of a capsule or the equivalent whose diaphragm, preloaded by an elastic restoring means, is subjected to the said negative pressure, which is modified by an electromagnetic valve the opening of which is controlled by a probe arranged in the exhaust manifold, the said probe being capable of delivering an electrical current which can vary in accordance with the composition of the burned gases, the said current being used for controlling the electromagnetic valve by way of any suitable electronic device.

When the engine operates with a carburettor, the venturi and the butterfly valve could be an integral part of the carburettor or equivalent device for regulating the liquid fuel and air mixture.

When the gas inlet is a fuel gas inlet, the electronic device which controls the electromagnetic valve acting on the negative pressure controlling the control valve is arranged to provide to the said control valve data for closing or opening depending on whether the current delivered by the probe situated in the exhaust manifold indicates that the air and fuel mixture is too rich or too poor.

Furthermore, preferably a linear probe will be used, that is to say a probe supplying a current which varies progressively in accordance with the composition of the burned gases, In fact when the fuel is at least partly a gas it is not necessary to make the engine operate with a mixture in the vicinity of the stoichiometric state but on the contrary it is possible because of the flammability of the mixture at low concentration, to obtain regulation of power by variation of the quantity of fuel admitted.

On the other hand it is found that when the butterfly valve is closed the negative pressure in the carburettor body becomes nil and can no longer play its part in controlling the control valve which controls the arrival of auxiliary air. On the other hand this negative pressure becomes sufficient to operate the said control valve, taking into account the size of the diaphragm and its return spring, only from a considerable engine speed onwards.

To overcome this disadvantage, there is provided a supplementary conduit which transmits to the capsule controlling the control valve for admission of secondary air a negative pressure which is in accordance with that which prevails in the induction pipe downstream of the butterfly valve.

Contrary to what happens in the venturi upstream the butterfly valve, the negative pressure in the induction manifold downstream of the butterfly valve is at its maximum when the said butterfly valve is closed. Thus at low working states the negative pressure of the manifold takes the place of or combines with the negative pressure in the venturi to provide the necessary energy for controlling the control valve. As soon as the operating state is sufficient, the negative pressure in the manifold falls and that which prevails in the venturi rises, and operation is then that which is described in the patent specification referred to earlier.

Preferably, a. this conduit is provided with a calibrated orifice so as to reduce the negative pressure prevailing in the induction pipe to any suitable value, b. the said calibrated orifice is such that the negative pressure at low running states falls to the extent of from about 450 g to less than 20 g approximately.

Furthermore, to prevent any reversing of the flow between the manifold and the induction pipe, non-return valves will be provided in each of the conduits which connect respectively the diaphragm capsules to the venturi on the one hand and to the induction manifold on the other hand.

BRIEF DESCRIPTION OF THE DRAWINGS

FIG. 2 illustrates the results obtained; it gives the percentage of CO in accordance with the speed of the vehicle with and without the regulating system provided by the present invention.

DETAILED DESCRIPTION OF THE PREFERRED EMBODIMENT

Figure 1:
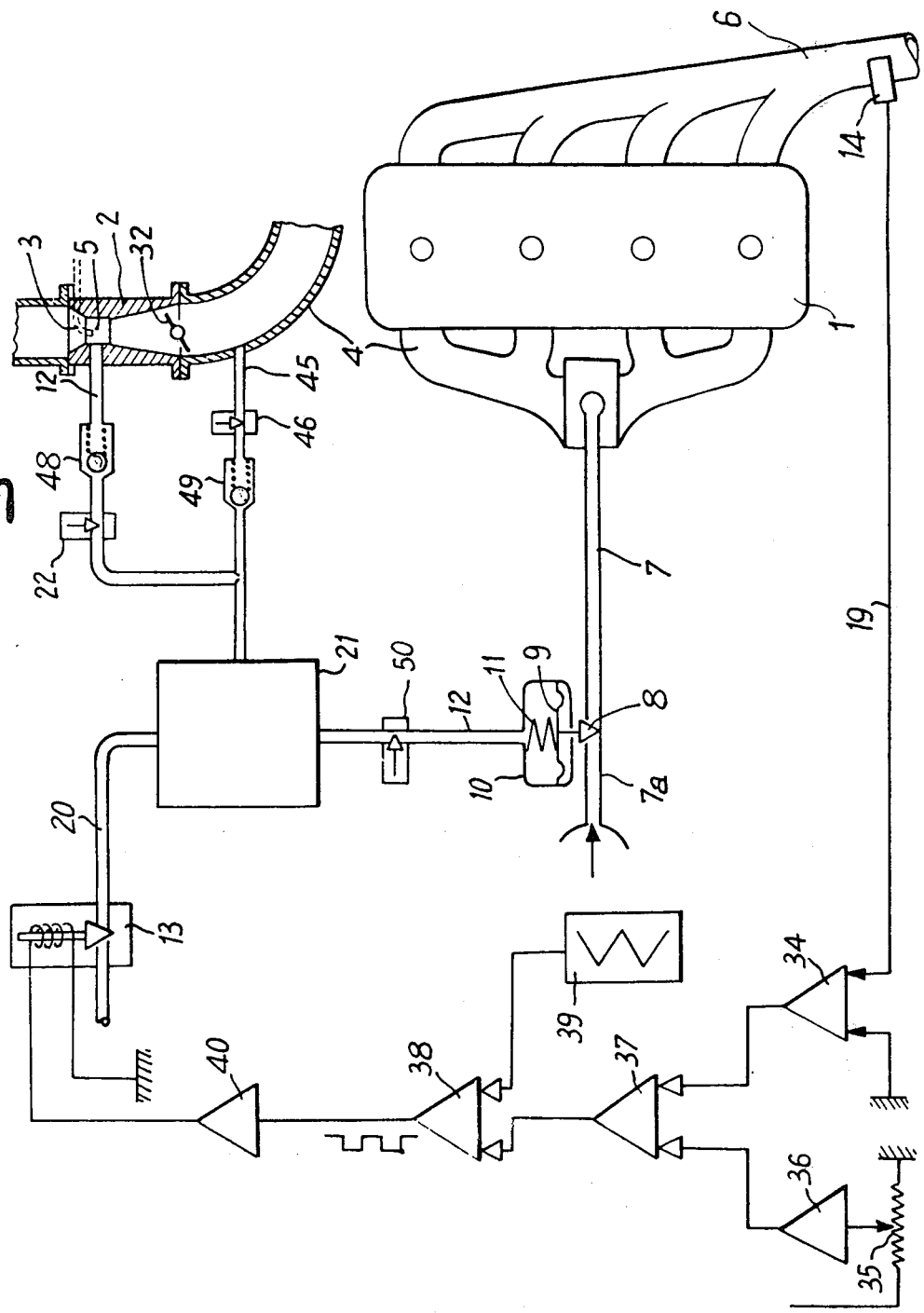
FIG. 1 is a general diagrammatic view of the regulating system comprising the features mentioned hereinbefore.

The device comprises a gas inlet 7 connected to the induction manifold 4 downstream of the butterfly valve 32 determining the air flow rate, this inlet 7 being controlled by the valve 8 which is controlled by the negative pressure prevailing in the throat of the venturi 5, (situated upstream of the butterfly valve 32), by way of the capsule 10 (or the equivalent) whose diaphragm 9 is preloaded by the spring 11. The negative pressure taken at the throat of the venturi 5 by way of the conduit 12 is modified by the electromagnetic valve 13 controlling the escape duct to the free atmosphere 20 of the buffer tank 21 into which the conduit 12 opens; the electromagnetic valve 13 is itself controlled by means of the electronic circuit 34, 40 by the probe 14 arranged in the exhaust manifold 6.

The electronic circuit 34, 40 is that which is described in the Patent Specification referred to earlier.

The electromagnetic valve 13 for modifying the negative pressure acting on the control valve 8 controlling the gas inlet 7 is controlled by an electronic circuit providing pulses whose recurrence frequency is constant and the duration variable in accordance with variations of the current delivered by the probe between two given limits, whereas beyond these limits the electromagnetic valve 13 is completely opened or completely closed.

Preferably the voltage provided by the probe 14 is compared with a reference voltage stabilised at an adjustable reference level, the interval obtained being compared with the pulses provided by a pulse generator producing sawtooth pulses of fixed amplitude and frequency, the pulses resulting therefrom being used after suitable amplification, for the control of the electromagentic valve 13 for modifying the negative pressure acting on the control valve 8 controlling the gas inlet 7.

The device operates as follows when the inlet 7 is a fuel gas inlet.

The mixture arriving by way of the induction pipe and the butterfly valve 32 being a lean mixture or air, the inlet 7 delivers into the manifold 4 of the engine 1 a quantity of fuel gas regulated in accordance with the data of the probe 14. When the latter provides data indicating that the mixture is too poor the circuit 34-40 transforms these data into signals for closing the electromagnetic valve 13, that is to say signals for opening the control valve 8. Conversely, if the mixture is too rich the electromagnetic valve 13 opens and the control valve 8 closes.

The fuel can be solely in the form of a gas and in this case it may be introduced wholly or partly by the conduit 7. When this is the case there is no carburettor and the member 5 is simply a venturi arranged upstream of the butterfly valve 32.

It is also possible to use the device in combination with a liquid or gaseous fuel provided by a carburettor 2. In this case the carburettor 2 comprises a fuel inlet 3 and the venturi 5 can be an integral part of the carburettor.

There is also provided a conduit 45 which also transmits to the capsule 10 through the agency of the volume 22 the negative pressure prevailing in the induction pipe 4, suitably reduced by the calibrated orifice 46.

When the engine runs at a low speed the negative pressure coming from the venturi 5 is almost nil, and in any case is too small to lift the control valve from its seat, and the negative pressure transmitted by the conduit 45 takes over the task of operating the control valve.

When the speed increases, the negative pressure emanating from the exhaust pipe 4 falls and the negative pressure prevailing at the venturi 5 rises, and now operates the control valve 8 in accordance with the Patent Specification referred to earlier.

Preferably the calibrated orifice 46 is such that the negative pressure transmitted is brought from values of about 450 g/cm² to values lower than 20 g/cm², for example about 5 to 15 g/cm². These values are only given by way of examples. They depend on the characteristics of the capsule 10 and the control valve 8, and also those of the negative pressure in the venturi 5 and the calibrated orifice 22 which reduces it.

The results obtained are illustrated by the curves in FIG. 2 which represent the percentage of carbon monoxide in the burned gases in accordance with the speed of the vehicle expressed in kilometres per hour. These curves have been achieved with a carburettor with a supply of petrol at 3 and an auxiliary air inlet at 7.

Zone A is the slow running zone and zones HCDE correspond to vehicle speeds obtained in first gear, second gear, third gear and fourth gear, that is to say the speed of movement of the vehicle in conventional use.

Curve I is that of the carburettor without any regulation.

Curve II is that obtained with the device shown in FIG. 1 with the regulating system regulated to its minimum.

Curve III is that obtained with the same device, with the system adjusted to its maximum.

These are curves established at a stabilised speed.

The effect of the conduit 45 predominates up to 40 km/h.

The effect of the conduit 12 predominates from there onwards.

It will be seen that with a maximum regulation of the system the CO rate is reduced to 0.1% throughout the regulating range and up to running states corresponding to high loads and speeds.

These curves do not show the maximum possibility of the regulating system according to the invention since, when curve III which corresponds to the maximum objective is obtained the regulating operation ceases, whereas its limits have not been reached, since the CO content cannot drop to a negative value.

The curve IV represents operation obtained in the absence of the conduit 45 transmitting the negative pressure to the manifold.

As illustrated, the calibrated orifices 22, 46 and 50 permit preferably adjustable pressure losses to be introduced, which give suitable respective proportions between the various negative pressures acting on the diaphragm 9 and providing time delays in the variations of these negative pressures.

Finally, according to the present invention non-return valves 48, 49 are provided for preventing any direct flow or flow reversal between the venturi 5 and the manifold 4.

When the fuel is a liquid (more particularly petrol) it is necessary to regulate the air-fuel mixture in the vicinity of the stoichiometric state. With a gas, in view of the flammability of the mixture at low concentration, this condition is no longer necessary. It is then possible to use the device according to the invention to provide power regulation by varying the reference dose on which automatic regulation is effected. This regulating could be provided by regulating the stabilised reference voltage 35 of the electronic device 34-40 which in this case will be subjected to the control of the operator. In fact it is this voltage which defines the composition of the burned gases which it is desired to obtain. This assumes that the probe 14 is a linear probe, that is to say a probe which delivers a current varying progressively in accordance with the composition of burned gases.

It is to be noted that if the fuel is only a liquid fuel the gas inlet 7 can be an inlet for secondary air as in the Patent Specification referred to earlier.

We claim:

1. An arrangement for correcting the proportion of the air and fuel mixture furnished to an internal combustion engine having an induction manifold containing a venturi and a butterfly valve for determining the air flow rate, and an exhaust manifold, said arrangement comprising:

means defining at least one gas inlet connected to the induction manifold downstream of the butterfly valve, means responsive to the negative pressure prevailing at the throat of the venturi upstream of the butterfly valve for controlling flow through said gas inlet, said control means including a control valve having a preloaded diaphragm, a conduit connecting the throat of the venturi and said control valve for subjecting the diaphragm to the negative pressure at the venturi throat, and resilient return means for biasing said diaphragm, and electric circuitry including a sensor disposed in the exhaust manifold of the engine for delivering an electric current which is variable as a function of the composition of the burnt gases, and an electromagnetic valve for modulating the negative pressure to which said diaphragm is subjected, said electromagnetic valve being regulated in response to the electric current delivered by said sensor.

2. An arrangement according to claim 1 including a second conduit connecting the induction manifold downstream of the butterfly valve and said control valve for subjecting the diaphragm to the negative pressure prevailing in the induction manifold downstream of the butterfly valve.

3. An arrangement according to claim 2 wherein said second conduit includes a calibrated orifice for reducing the latter mentioned negative pressure to which said diaphragm is subjected.

4. An arrangement according to claim 3 wherein said calibrated orifice is such that the latter mentioned negative pressure at low engine running conditions is reduced from about 450 g/cm$^2$ to less than about 20 g/cm$^2$.

5. An arrangement according to claim 2 including a non-return valve in each of said conduits.

6. An arrangement according to claim 1 wherein said gas inlet means constitutes a fuel gas inlet, said circuitry including regulating circuit means for receiving the electric current from said sensor and for delivering regulating pulses to said electromagnetic valve of which the recurrence frequency is constant and the duration is variable as a function of the variation in the electric current supplied by said sensor between two predetermined limits, whereas beyond these limits, said electromagnetic valve is completely open or completely closed.

7. An arrangement according to claim 6 wherein said sensor comprises a linear probe.

8. A device according to claim 1 wherein said circuitry includes means for providing a reference voltage defining the composition of the burnt gases to be obtained, and means for regulating said reference voltage.

9. An arrangment according to claim 1 wherein said control means comprises a buffer tank disposed in the conduit connecting said control valve and the venturi of the induction manifold, said tank having a discharge duct open to atmosphere, said electromagnetic valve being disposed in said discharge duct.

10. An arrangement according to claim 6 wherein said circuit means includes a generator for supplying sawtooth pulses of fixed amplitude and frequency, and means for comparing the pulses supplied by said generator and the variation between the voltage supplied by said sensor and a stabilized voltage set at an adjustable reference level, the pulses resulting therefrom, after suitable amplification, being used for regulating said electromagnetic valve.

* * * * *